United States Patent
Flöther et al.

(10) Patent No.: US 12,190,204 B2
(45) Date of Patent: Jan. 7, 2025

(54) PHYSICAL REPRESENTATION OF QUANTUM ENTANGLEMENT

(71) Applicant: International Business Machines Corporation, Armonk, NY (US)

(72) Inventors: Frederik Frank Flöther, Schlieren (CH); Jared Andrew Limberg, Shaker Heights, OH (US); Vinod A. Valecha, Pune (IN); Freddy Lorge, Clos du Pré Madame (BE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 339 days.

(21) Appl. No.: 17/555,003

(22) Filed: Dec. 17, 2021

(65) Prior Publication Data

US 2023/0196160 A1   Jun. 22, 2023

(51) Int. Cl.
*G06N 10/40* (2022.01)

(52) U.S. Cl.
CPC .................... *G06N 10/40* (2022.01)

(58) Field of Classification Search
USPC ........................................................ 716/100
See application file for complete search history.

(56) References Cited

U.S. PATENT DOCUMENTS

| | | | |
|---|---|---|---|
| 7,226,961 B2 | 6/2007 | Park et al. | |
| 10,565,515 B2 | 2/2020 | Lampert et al. | |
| 10,790,913 B2 | 9/2020 | Henningsen et al. | |
| 10,879,446 B2 | 12/2020 | Caudillo et al. | |
| 2019/0313172 A1* | 10/2019 | Sunshine | H05K 1/189 |
| 2020/0335011 A1 | 10/2020 | Limberg et al. | |
| 2020/0409534 A1* | 12/2020 | Xia | G06F 3/04817 |
| 2021/0406392 A1* | 12/2021 | Coady | G06F 21/6227 |

OTHER PUBLICATIONS

QISKIT | "qiskit.visualization.plot_state_qsphere", webpage https://qiskit.org/documentation/stubs/qiskit.visualization.plot_state_qsphere.html, last accessed Nov. 16, 2021, 2 pages.

Quantum Computing Stack Exchage | "Can the Bloch sphere be generalized to two qubits?", webpage https://quantumcomputing.stackexchange.com/questions/4699/can-the-bloch-sphere-be-generalized-to-two-qubits, last accessed Nov. 16, 2021, 6 pages.

Ireland, P. T. et al. | "The response time of a surface thermometer employing encapsulated thermochromic liquid crystals". 1987 J. Phys. E: Sci. Instrum. 20 1195, 6 pages.

Plenio M. B. et al. | "An introduction to entanglement measures". arXiv:quant-ph/0504163v3 Jun. 10, 2006, 31 pages.

(Continued)

*Primary Examiner* — Bryce M Aisaka
(74) *Attorney, Agent, or Firm* — Amin, Turocy & Watson, LLP

(57) ABSTRACT

Apparatuses, system, and computer-implemented methods to facilitate physical representation of quantum entanglement are provided. According to an embodiment, an apparatus can comprise two or more qubit representation devices that interact with one another in a defined manner, and a display component operatively coupled to at least one of the two or more qubit representation devices, wherein the display component outputs a visual indicator of quantum entanglement between the two or more qubit representation devices.

20 Claims, 10 Drawing Sheets

(56) References Cited

OTHER PUBLICATIONS

Calixto, M. | "Quantum computation and cryptography: an overview". Nat Comput 8, 663 (2009). https://doi.org/10.1007/s11047-008-9094-8, 18 pages.
Rajna, G. | "Ternary Quantum Entanglement". 2020, 41 pages.
Rajna, G. | "Quantum Entangled Single Pair Photons". 2020, 72 pages.
Zhao, X.-Sh. et al. | "On Quantum Physics". IP.com No. IPCOM000266123D, IP.com Electronic Publication Date: Jun. 15, 2021, 27 pages.
IP.com | "Scheduling Quantum Circuit for Noise Simulation". IP.com No. IPCOM000265861D, IP.com Electronic Publication Date: May 20, 2021, 6 pages.
IP.com | "Quantum Developer Visualization Tool (QDVT)". IP.com No. IPCOM000261581D, IP.com Electronic Publication Date: Mar. 18, 2020, 8 pages.
IP.com | "System and method to assess quantum use case potential". IP.com No. IPCOM000261173D, IP.com Electronic Publication Date: Feb. 5, 2020, 5 pages.

\* cited by examiner

PHYSICAL REPRESENTATION OF QUANTUM ENTANGLEMENT

BACKGROUND

The subject disclosure relates to visualization of quantum entanglement, and more specifically, to physical representation of quantum entanglement.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate physical representation of quantum entanglement are provided.

According to an embodiment, an apparatus can comprise two or more qubit representation devices that interact with one another in a defined manner. The apparatus can further comprise a display component operatively coupled to at least one of the two or more qubit representation devices, wherein the display component outputs a visual indicator of quantum entanglement between the two or more qubit representation devices.

According to an embodiment, a system can comprise two or more qubit representation devices that interact with one another in a defined manner. The system can further comprise a display component operatively coupled to at least one of the two or more qubit representation devices, wherein the display component outputs a visual indicator of quantum entanglement between the two or more qubit representation devices.

According to another embodiment, a computer-implemented method can comprise outputting, by a system operatively coupled to a processor, a visual indicator of quantum entanglement between two or more qubit representation devices.

DETAILED DESCRIPTION

Figure 1:
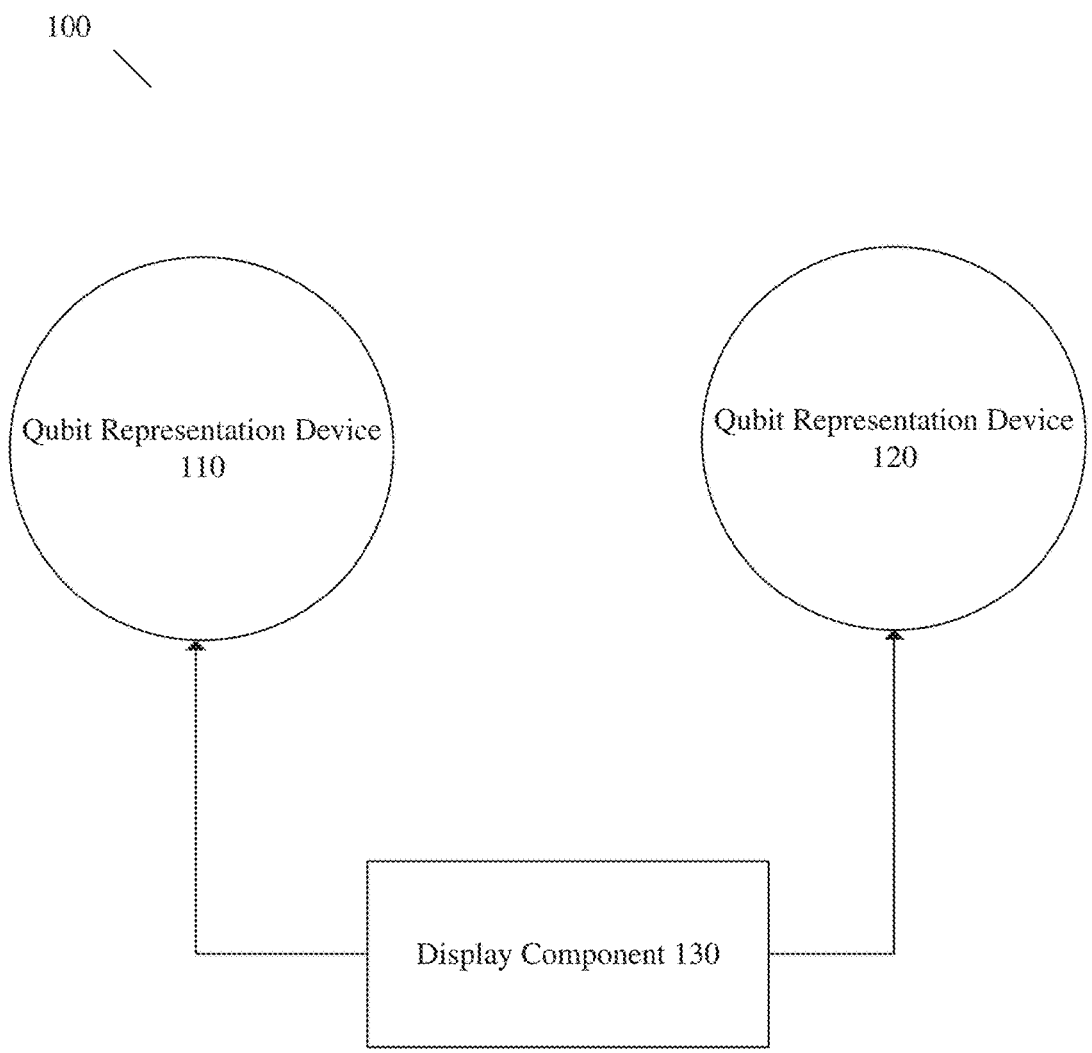
FIG. 1 illustrates an example, non-limiting physical representation of quantum entanglement apparatus in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computing has seen significant progress over the last years. Quantum computing is now in the "quantum ready" era where the goal is to explore potential use cases for quantum computing and foster education so that more people can explore quantum technology and develop quantum applications. However, quantum mechanics is counter-intuitive and it can be challenging to grasp and visualize key concepts of quantum mechanics such as quantum entanglement between qubits and the quantum state of qubits. Depending on the degree of entanglement, the likelihood of qubit state may depend on what happens to the other one. For example, for the maximally entangled Bell states knowing the result of measuring one qubit immediately determines the result of measuring the other qubit ("spooky action at a distance"). Note that here it is generally assumed that projective measurements that lead to a full wavefunction collapse; nevertheless, the systems, methods, and/or apparatuses disclosed herein also work with weak measurements where only a partial wavefunction collapse occurs. This difficulty in grasping key concepts of quantum mechanics serves as a barrier to a greater number of people understanding and utilizing quantum computing.

Given the problems described above with visualizing key concepts of quantum entanglement, the present disclosure can be implemented to produce a solution to these problems in the forms of systems, apparatuses, and computer-implemented methods that can facilitate physical representation of quantum entanglement by: outputting a visual indicator of quantum entanglement between two or more qubit representation devices.

In some embodiments, the present disclosure can be implemented to produce a solution to the problems described above in the forms of systems, apparatuses, and computer-implemented methods that can further facilitate physical representation of quantum entanglement by: outputting a second visual indicator of the quantum state of at least one of the two or more qubit representation devices.

As referenced herein, an "entity" can comprise a human, a client, a user, a computing device, a software application, an agent, a machine learning (ML) model, an artificial intelligence (AI) model, and/or another entity.

FIG. 1 illustrates an example, non-limiting physical representation of quantum entanglement apparatus 100 in accordance with one or more embodiments described herein. Repetitive description of like elements employed in respective embodiments is omitted for sake of brevity. According to some embodiments, apparatus 100 can comprise two or more qubit representation devices (qubit representation devices 110 and 120) that interact with one another in a defined manner and a display component (display component 130) operatively coupled to at least one of the two or more qubit representation devices, wherein the display component outputs a visual indicator of quantum entanglement between the two or more qubit representation devices. According to some embodiments, qubit representation devices 110 and 120 can be spherical in shape. In an embodiment, qubit representation devices 110 and 120 can be any shape, including but not limited to, cylindrical shaped, cube shaped, or the like.

In an embodiment, display component 130 can be located external from qubit representation devices 110 and 120. For example, in an embodiment, display component 130 can comprise a projector that projects a visual indicator of quantum entanglement onto qubit representation device 110, qubit representation device 120, and/or both qubit representation devices 110 and 120. In another embodiment, display component 130 can comprise an augmented reality device that outputs the visual indicator depending on which qubit representation device a user looks at. For example, display component 130 can comprise a virtual reality headset that displays a visual indicator of quantum entanglement when a user looks at qubit representation device 110, qubit representation device 120, and/or both qubit representation devices 110 and 120. In an embodiment, display component 130 can output a visual indicator of quantum entanglement between qubit representation devices 110 and 120 by displaying a band extending from qubit representation device 110 to qubit representation device 120. For example, display component 130 can output a visual band connecting qubit representation device 110 and 120. The thickness of the band can denote the degree of quantum entanglement. For example, a thick band can represent a high degree of quantum entanglement and a thin band can represent a low degree of quantum entanglement.

In another embodiment, display component 130 can output a second visual indicator of the quantum state of qubit representation device 110, and/or qubit representation device 120. For example, if the quantum state of qubit representation device 110 is 0, then display component 130 can output a visual indicator of the color black onto qubit representation device 110 to show that qubit representation device 110 is in the 0 state.

In an additional embodiment, the visual indicator can comprise a color scale output on to the surface of at least one of the two or more qubit representation devices. For example, a color scale can be used where red represents high quantum entanglement, orange represents moderate quantum entanglement, and yellow represents little or no quantum entanglement. In this example, if qubit representation device 110 is highly entangled, then display component 130 can output a visual indicator of the color red onto the surface of qubit representation device 110.

In an additional embodiment, the second visual indicator can be on a transparency scale. For example, opaque can represent a high probability of the qubit representation device being found in the 0 state and transparent can represent a high probability of finding the qubit representation device in the 1 state. In this example, if qubit representation device 110 is highly entangled and has a high probability of being found in the 0 state, then display component 130 can output a visual indicator of the color red onto the surface of qubit representation device 110 and a second visual indicator that is opaque on top of the visual indicator.

In another embodiment, display component 130 can display stripes on qubit representation device 110 and/or qubit representation device 120. For example, if display component 130 outputs a visual indicator comprising a stripe of the same color on to both qubit representation device 110 and qubit representation device 120, then there is entanglement between qubit representation device 110 and qubit representation device 120. Similarly, if qubit representation device 110 and qubit representation device 120 do not have a visual indicator of the same color stripe, then there is no entanglement between qubit representation device 110 and qubit representation device 120. In the above example, the brightness or shade of color of the visual indicator can represent the strength of the entanglement. For example, if qubit representation device 110 and qubit representation device 120 both have a visual indicator comprising a bright blue stripe, then the entanglement between qubit representation device 110 and qubit representation device 120 is high. Conversely, if qubit representation device 110 and qubit representation device 120 both have a visual indicator comprising a dull blue stripe, then the entanglement between qubit representation device 110 and qubit representation device 120 is low. In another embodiment, the degree or strength of entanglement can be shown by the shade of the color of the stripe. For example, a darker shade can represent a high degree of entanglement while a lighter shade can represent a lower degree of entanglement.

In some embodiments, qubit representation device 110 and/or qubit representation device 120 can be coupled (e.g., communicatively, electrically, operatively, optically, and/or coupled via another type of coupling) to display component 130 and/or to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet) or a local area network (LAN). Display component 130 can communicate with qubit representation device 110 and/or qubit representation device 120 using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802. XX wireless technologies and/or legacy telecommunication technologies, BLUETOOTH®, Session Initiation Protocol (SIP), ZIG- BEE®, RF4CE protocol, WirelessHART protocol, 6LoW-PAN (IPv6 over Low power Wireless Area Networks), Z-Wave, an ANT, an ultra-wideband (UWB) standard protocol, and/or other proprietary and non-proprietary communication protocols.

Figure 2:
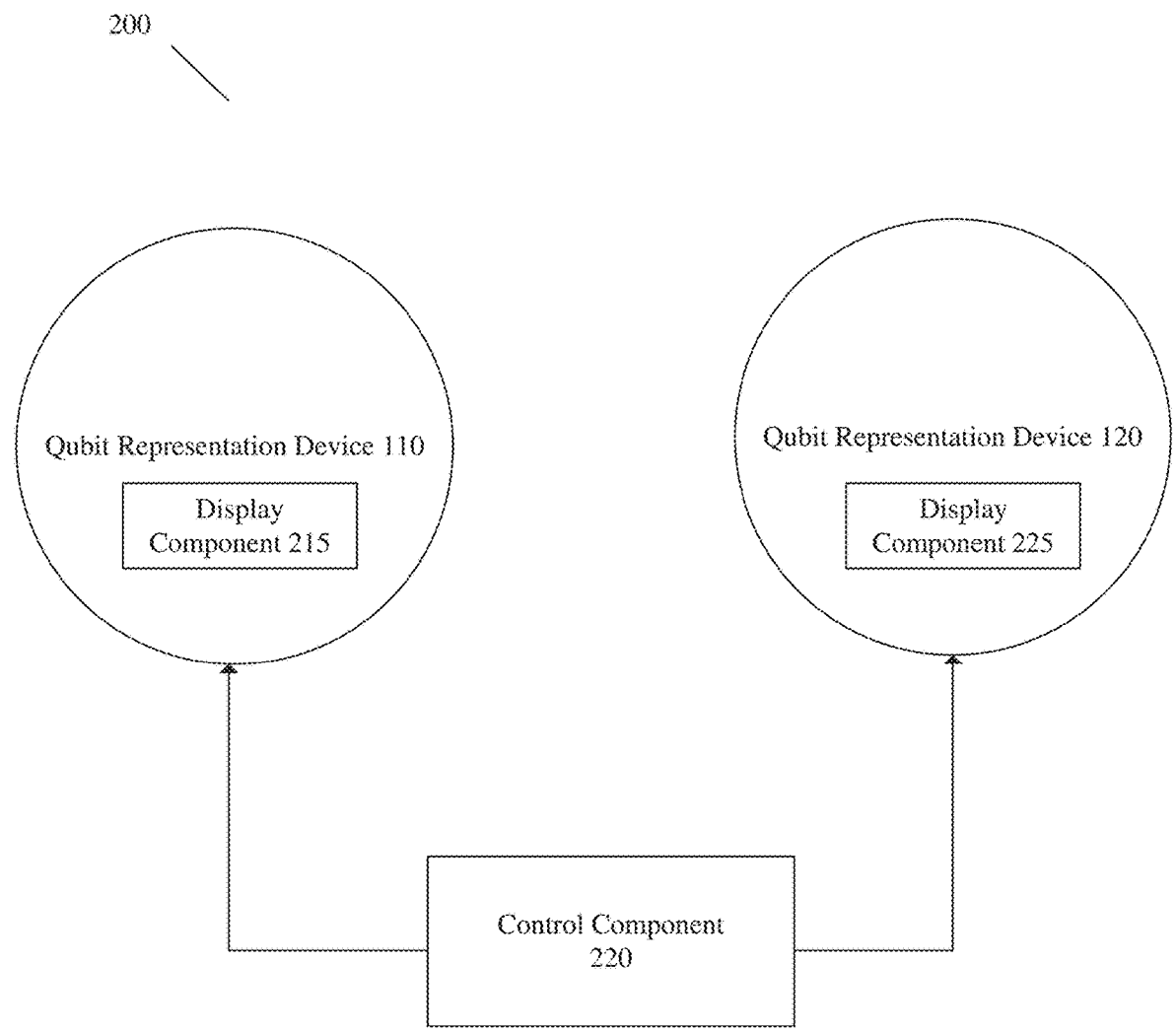
FIG. 2 illustrates an example, non-limiting physical representation of quantum entanglement apparatus in accordance with one or more embodiments described herein.

FIG. 2 illustrates an example, non-limiting physical representation of quantum entanglement apparatus 200 in accordance with one or more embodiments described herein. Repetitive description of like elements employed in respective embodiments is omitted for the sake of brevity. According to an embodiment, qubit representation device 110 and qubit representation device 120 of apparatus 200 can each comprise a display component 215 and 225 respectively in order to facilitate outputting of a visual indicator of the quantum entanglement between qubit representation device 110 and qubit representation device 120. For example, in an embodiment, display components 215 and 225 can comprise one or more light emitting diodes (LEDs). These LEDs can be located either within or on the surface of qubit representation devices 110 and 120 respectively. In another embodiment display components 215 and 225 can comprise a visual display screen such as an organic light-emitting diode (OLED) display, an LED display, liquid crystal (LCD) display, a digital light processing (DLP) display, a plasma display screen, and/or another suitable visual display screen located on the surface of and/or within qubit representation device 110 and/or qubit representation device 120. In an embodiment, qubit representation device 110 and qubit representation device 120 can comprise a transparent outer layer to facilitate viewing of the visual indicator of quantum entanglement. For example, qubit representation device 110 and/or qubit representation device 120 can comprise an outer layer of glass or of a clear polymer. In another embodiment, qubit representation device 110 and/or qubit representation device 120 can comprise an outer layer of an opaque polymer that still allows viewing of a visual indicator from within. In other embodiments, qubit representation device 110 and/or qubit representation device 120 can comprise a non-transparent outer surface to facilitate projection of the visual indicator onto the surface.

In another embodiment, qubit representation device 110 and/or qubit representation device 120 can comprise a thermochromic material, such as thermochromic liquid crystals or leuco dyes, that changes color based on a change in temperature. For example, qubit representation device 110 and/or qubit representation device 120 can comprise a surface layer made of a thermochromic polymer or covered with a thermochromic paint or dye. Display component 215 and/or display component 225 can output a visual indicator of quantum entanglement of qubit representation device 110 and qubit representation device 120 by applying different temperatures to different regions of the thermochromic material of qubit representation device 110 and/or qubit representation device 120 using a heating element, such as an electrical heating element.

In an embodiment, apparatus 200 can further comprise a control component operatively coupled to the display component, comprising a computer-readable storage medium having program instructions embodied therewith, the program instructions executable by a processor to cause the processor to receive a quantum state of at least one of the two or more qubit representation devices and a degree of quantum entanglement between the two or more qubit representation devices, computer a probability of finding at least one of the two or more qubit representation devices in a given state after a measurement of the quantum state of the at least one of the two or more qubit representation devices, and signal the display component to change the visual indicator based on the computed probability and the degree of quantum entanglement.

For example, control component 220 can receive an initial degree of quantum entanglement between qubit representation device 110 and qubit representation device 120 and an initial probability of the quantum state of qubit representation device 110 and/or qubit representation device 120. Based on these inputs, control component 220 can signal display component 215 to output a visual indicator of quantum entanglement for qubit representation device 110 and/or a second visual indicator of the quantum state of qubit representation device 110. Similarly, control component 220 can signal display component 225 to output a visual indicator of quantum entanglement for qubit representation device 120 and/or a second visual indicator of the quantum state of qubit representation device 120. Control component 220 can then receive a measurement instruction to update/change the quantum state and/or quantum entanglement of qubit representation device 110 and qubit representation device 120. As described herein, a measurement instruction can comprise a request to change an entanglement degree or a state probability comprising therefore a value for a degree of quantum entanglement between two or more qubit representation devices and/or the probability of finding a qubit representation device in a given state. For example, control component 220 can receive a measurement instruction comprising an updated probability of finding qubit representation device 110 in a given state and an updated degree of entanglement between qubit representation device 110 and qubit representation device 120. In case the value of the requested state probability is 100%, control component 220 can assign the new state of qubit representation device 110 to a '0' state or '1' state (note that this quantum state would then correspond to a classical state). In case the value of the requested state probability is not 100%, control component 220 can assign the new state of qubit representation device 110 to the requested state. In general, there may be different options for the overall state of all qubit representation devices, that is, different overall states could result in the same probability of finding a given qubit representation in a certain quantum state or a certain classical 0 or 1 state after measurement. In such cases, a random number generator may be used to decide which overall state should be chosen. In another embodiment, the user may be asked to explicitly select an overall state. Control component 220 can then signal display components 215 and 225 to change the visual indicators accordingly. Control component 220 can signal display component 215 and display component 225 to update the visual indicator of quantum entanglement based on the updated degree of quantum entanglement and the second visual indicator based on the new quantum state.

As qubit representation device 110 and qubit representation device 120 are quantum entangled, the updating of the quantum state of qubit representation device 110 will have an impact on the quantum state of qubit representation device 120. Control component 220 can implement a correlation instruction to update the quantum state of qubit representation device 120 based on the measurement instruction. The correlation instruction can instruct control component 220 to determine a new quantum state of qubit representation device 120 using the new quantum state of qubit representation device 110, the probability of finding qubit representation device 120 in a given quantum state, and the updated degree of quantum entanglement between qubit representation device 110 and qubit representation device 120. For example, the higher degree of entanglement between qubit representation device 110 and qubit representation device 120, the greater the effect of the change in state of one will have on the other. Control component 220 can then signal display component 225 to update the second visual indicator of qubit representation device 120 to reflect the new quantum state. It should be appreciated that control component 220 can update the state as described above for all qubit representation devices entangled to a qubit representation device that has its quantum state updated using multiple correlation instructions. For example, apparatus 200 can comprise a third qubit representation device (not shown). If the third qubit representation device is entangled with qubit representation device 110, control component 220 can update the quantum state of the third qubit representation device in the same manner as described above in reference to qubit representation device 120. Additionally, if the third qubit representation device is not entangled to qubit representation device 110, but is entangled to qubit representation device 120, control component 220 can update the quantum state of the third qubit device based on the updated quantum state of qubit representation device 120, the probability of finding the third qubit representation device in a given quantum state, and the degree of entanglement between qubit representation device 120 and the third qubit representation device. This process can then be repeated for any qubit representation devices that are entangled with the third qubit representation device.

In an embodiment, control component 220 can manage and execute measurement instructions from one or more users and sequentially update the state and level of quantum entanglement of at least one of the two or more qubit representation devices. For example, control component 220 can manage a queue of all measurement instructions and all correlation instructions. When control component 220 receives a measurement instruction, control component 220 can assign a time value to the measurement instruction and place the measurement instruction in a measure queue. Control component 220 can then perform the measurement instruction in the measure queue with the lowest time value. Control component 220 can then add any correlation instructions triggered by the measurement instruction with the lowest time value to the correlation queue and assign the correlation instructions the same time value as the measurement instruction that triggered them. Control component 220 can then perform the correlation instructions in the correlation queue. After performing the correlation instructions, control component 220 can remove the correlation instructions from the correlation queue and remove the measurement instruction from the measure queue. Control component 220 can then perform the measurement instruction in the measure queue with the next lowest time value.

Figure 3:
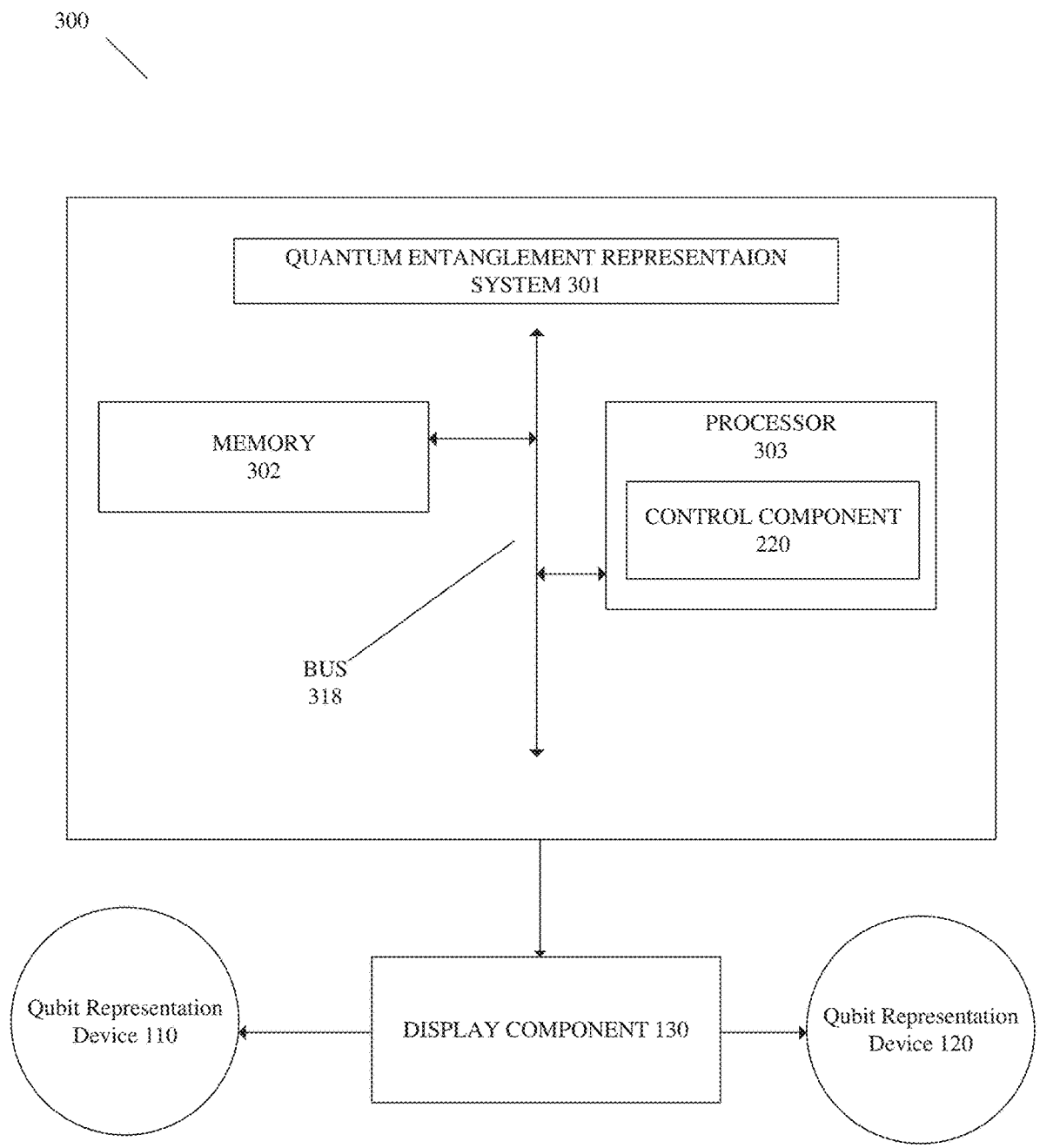
FIG. 3 illustrates a block diagram of an example, non-limiting computer implemented system that facilitates functions of a physical representation of quantum entanglement apparatus in accordance with one or more embodiments described herein.

FIG. 3 illustrates a block diagram of an example, non-limiting computer implemented system 300 that facilitates functions of apparatus 100 and/or apparatus 200 in accordance with one or more embodiments described herein. System 300 comprises quantum entanglement representation system 301. Quantum entanglement representation system 301 can comprise a memory 302, a processor 303, a control component 220, and display component 130.

It should be appreciated that the embodiments of the subject disclosure depicted in various figures disclosed herein are for illustration only, and as such, the architecture of such embodiments are not limited to the systems, devices, apparatuses, and/or components depicted therein. For example, in some embodiments, system 300 and/or quantum entanglement representation system 301 can further comprise various computer and/or computing-based elements described herein with reference to operating environment 1000 and FIG. 10. In several embodiments, such computer and/or computing-based elements can be used in connection with implementing one or more of the systems, devices, components, and/or computer-implemented operations shown and described in connection with FIGS. 1, 2, 3, and/or other figures disclosed herein.

Memory 302 can store one or more computer and/or machine readable, writable, and/or executable components and/or instructions that, when executed by processor 303 (e.g., a classical processor, a quantum processor, and/or another type of processor), can facilitate performance of operations defined by the executable component(s) and/or instruction(s). For example, memory 302 can store computer and/or machine readable, writable, and/or executable components and/or instructions that, when executed by processor 303, can facilitate execution of the various functions described herein relating to quantum entanglement representation system 301, control component 220, display component 130, and/or another component associated with quantum entanglement representation system 301.

Memory 302 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 302 are described below with reference to system memory 1016 and FIG. 10. Such examples of memory 302 can be employed to implement any embodiments of the subject disclosure.

Processor 303 can comprise one or more types of processors and/or electronic circuitry (e.g., a classical processor, a quantum processor, and/or another type of processor and/or electronic circuitry) that can implement one or more computer and/or machine readable, writable, and/or executable components and/or instructions that can be stored on memory 302. For example, processor 303 can perform various operations that can be specified by such computer and/or machine readable, writable, and/or executable components and/or instructions including, but not limited to, logic, control, input/output (I/O), arithmetic, and/or the like. In some embodiments, processor 303 can comprise one or more central processing unit, multi-core processor, microprocessor, dual microprocessors, microcontroller, System on a Chip (SOC), array processor, vector processor, quantum processor, and/or another type of processor. Further examples of processor 303 are described below with reference to processing unit 1014 and FIG. 10. Such examples of processor 303 can be employed to implement any embodiments of the subject disclosure.

Quantum entanglement representation system 301, memory 302, processor 303, control component 220, display component 130, and/or another component of quantum entanglement representation system 301 as described herein can be communicatively, electrically, operatively, and/or optically coupled to one another via bus 318 to perform functions of system 300, apparatus 100, apparatus 200, quantum entanglement representation system 301, and/or any components coupled therewith. Bus 318 can comprise one or more memory bus, memory controller, peripheral bus, external bus, local bus, a quantum bus, and/or another type of bus that can employ various bus architectures. Further examples of bus 318 are described below with reference to system bus 1018 and FIG. 10. Such examples of bus 318 can be employed to implement any embodiments of the subject disclosure.

Quantum entanglement representation system 301 can comprise any type of component, machine device, facility, apparatus, and/or instrument that comprises a processor and/or can be capable of effective and/or operative communication with a wired and/or wireless network. All such embodiments are envisioned. For example, quantum entanglement representation system 301 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Quantum entanglement representation system 301 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or a cable. For example, quantum entanglement representation system 301 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, quantum entanglement representation system 301 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet) or a local area network (LAN). Quantum entanglement representation system 301 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802. XX wireless technologies and/or legacy telecommunication technologies, BLUETOOTH®, Session Initiation Protocol (SIP), ZIG-BEE®, RF4CE protocol, WirelessHART protocol, 6LoW-PAN (IPv6 over Low power Wireless Area Networks), Z-Wave, an ANT, an ultra-wideband (UWB) standard protocol, and/or other proprietary and non-proprietary communication protocols. Therefore, in some embodiments, quantum entanglement representation system 301 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between quantum entanglement representation system 301 and external systems, sources, and/or devices (e.g., computing devices, communication devices, and/or another type of external system, source, and/or device).

Quantum entanglement representation system 301 can comprise one or more computer and/or machine readable, writable, and/or executable components and/or instructions that, when executed by the processor 303 (e.g., a classical processor, a quantum processor, and/or another type of processor), can facilitate performance of operations defined by such component(s) and/or instruction(s). Further, in numerous embodiments, any component associated with quantum entanglement representation system 301, as described herein with or without references to the various figures of the subject disclosure, can comprise one or more computer and/or machine readable, writable, and/or executable components and/or instructions that, when executed by processor 303, can facilitate performance of operations defined by such component(s) and/or instruction(s). For example, control component 220, display component 130, and/or any other components associated with quantum entanglement representation system 301 as disclosed herein (e.g., communicatively, electronically, operatively, and/or optically coupled with and/or employed by quantum entanglement representation system 301), can comprise such computer and/or machine readable, writable, and/or executable component(s) and/or instruction(s). Consequently, according to numerous embodiments, quantum entanglement representation system 301 and/or components associated therewith as disclosed herein, can employ processor 303 to execute such computer and/or machine readable, writable, and/or executable component(s) and/or instruction(s) to facilitate performance of one or more operations described herein with reference to quantum entanglement representation system 301 and/or any such components associated therewith.

Quantum entanglement representation system 301 can facilitate (e.g., via processor 303) performance of operations executed by and/or associated with control component 220, display component 130, and/or another component associated with quantum entanglement representation system 301 as described herein. For example, as described in detail below, quantum entanglement representation system 301 can facilitate (e.g., via processor 303): receiving a quantum state of at least one of two or more qubit representation devices and a degree of quantum entanglement between the two or more qubit representation devices, compute a probability of finding at least one of the two or more qubit representation devices in a given state after a measurement of the quantum state of the at least one of the two or more qubit representation devices, signaling the display component to change the visual indicator of quantum entanglement between the two or more qubit representation devices based on the computed probability and degree of quantum entanglement, and outputting the visual indicator.

Display component 130 can output a visual indicator of quantum entanglement between two or more qubit representation devices. For example, as described above, display component 130 can comprise a projector and/or virtual reality headset component which can display a visual band connecting two or more qubit representation devices. In another embodiment, display component 130 can output a second visual indicator of the quantum state of a qubit representation device. For example, display component 130 can output a visual indicator on to the surface of one or more qubit representation devices, wherein the color and/or shade of the visual indicator represents a quantum state or probability of finding the qubit representation device in a given quantum state.

In another embodiment, display component 130 can output a visual indicator of quantum entanglement, wherein the visual indicator comprises a stripe of the same color and/or shade on two or more qubit representation devices to represent a degree of quantum entanglement between the two or more qubit representation devices. In an embodiment, quantum entanglement representation system 301 can comprise multiple display components, one for each qubit representation devices. For example, as described in reference to FIG. 2, a display component can be contained within each qubit representation device or on the surface of each qubit representation device. For example, the display components can comprise one or more LEDs and or a visual display screen. Examples of visual display screens include, but are not limited to, an organic light-emitting diode (OLED) display, an LED display, liquid crystal (LCD) display, a digital light processing (DLP) display, a plasma display screen, and/or another suitable visual display screen.

Control component 220 can receive a quantum state of at least one qubit representation device and a degree of quantum entanglement between two or more qubit representation devices, compute a probability of finding at least one of the two or more qubit representation devices in a given state after a measurement of the quantum state of at least one of the two or more qubit representation devices, and signal display component 130 to change the visual indicator based on the computed probability and degree of quantum entanglement. In another embodiment, control component 220 can also signal display component 130 to change a second visual indicator of the quantum state of at least one of the two or more qubit representation devices based on the computed probability and degree of quantum entanglement.

For example, control component 220 can receive a degree of quantum entanglement between a first and a second qubit representation device, a probability of finding the first qubit representation device in a given quantum state, and/or the probability of finding the second qubit representation device in a given quantum state. Based on these inputs, control component 220 can signal display component 130 to output a visual indicator of quantum entanglement on the first and/or the second qubit representation device. Control component 220 can also signal display component 130 to output a second visual indicator of the quantum state of the first and/or the second qubit representation device. Control component 220 can then receive a measurement instruction to change the quantum state and/or quantum entanglement of the first and/or the second qubit representation devices. For example, control component 220 can receive a measurement instruction comprising an updated probability of finding the first qubit representation device in a given quantum state and an updated degree of quantum entanglement between the first and the second qubit representation devices. Control component 220 can then determine the new quantum state of the first qubit representation device using the updated probability and a random number generator to determine the quantum state. Control component 220 can signal display component 130 to update the first and the second visual indicator to represent the new degree of quantum entanglement and the new quantum state of the first qubit representation device.

If the first and second qubit representation devices are entangled, control component 220 can implement a correlation instruction to update the quantum state of the second qubit representation device. The correlation instruction can instruct control component 220 to determine a new quantum state of the second qubit representation device using the new quantum state of the first qubit representation device, the probability of finding the second qubit representation device in a given quantum state, and the new degree of quantum entanglement between the first qubit representation device and the second qubit representation device. Control component 220 can then signal display component 130 to update the first and second visual indicators of the second qubit representation device. It should be appreciated that system 300 can include additional qubit representation devices. For example, control component 220 can perform correlation instructions for all qubit representation devices entangled with the first qubit representation device. Additionally, control component 220 can perform correlation instructions for all qubit representation devices entangled with a qubit representation device that has its quantum state updated. In the above example, given a third qubit representation device entangled with the second qubit representation device but not entangled with the first qubit representation device, control component 220 can perform a correlation instruction relating the third qubit representation device after performing the correlation instruction relating to the second qubit representation device.

In an embodiment, the control component can manage and execute measurement instructions from one or more users and sequentially update the state and level of quantum entanglement of at least one of the two or more qubit representation devices. For example, control component 220 can manage a queue of all measurement instructions and all correlation instructions. When control component 220 receives a measurement instruction, control component 220 can assign a time value to the measurement instruction and place the measurement instruction in a measure queue. Control component can then perform the measurement instruction in the measure queue with the lowest time value. Control component 220 can then add any correlation instructions triggered by the measurement instruction with the lowest time value to the correlation queue and assign the correlation instructions the same time value as the measurement instruction that triggered them. Control component 220 can then perform the correlation instructions in the queue. After performing the correlation instructions, control component 220 can remove the correlation instructions from the correlation queue and remove the measurement instruction from the measure queue. Control component 220 can then perform the measurement instruction in the measure queue with the next lowest time value.

Figure 4:
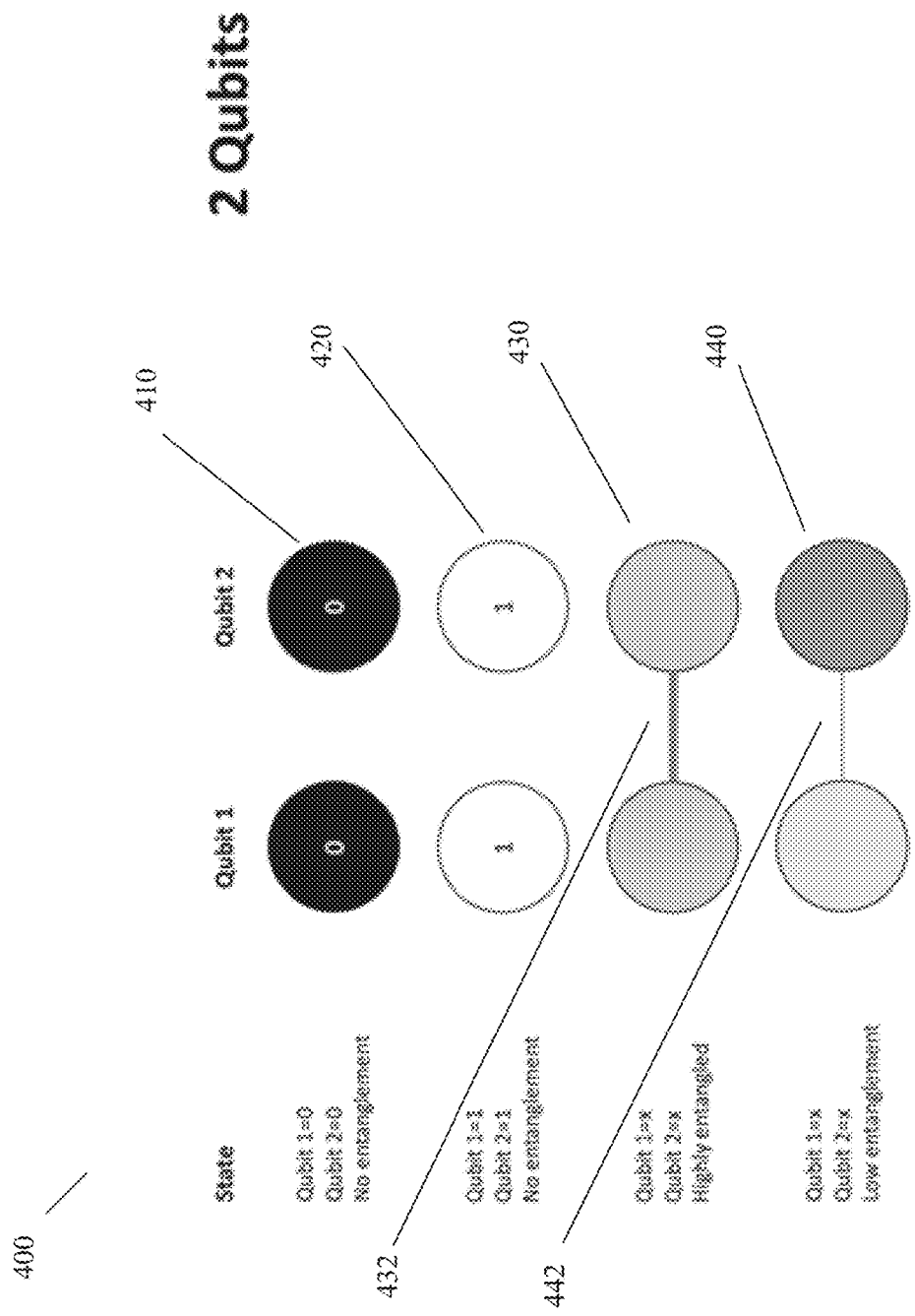
FIG. 4 illustrates an example, non-limiting diagram that can facilitate representation of quantum entanglement in accordance with one or more embodiments described herein.

FIG. 4 illustrates an example, non-limiting diagram 400 that can facilitate representation of quantum entanglement in accordance with one or more embodiments described herein. Repetitive description of like elements and/or processes employed in respective embodiments is omitted for sake of brevity.

Diagram 400 comprises four representations of a visual indicator of quantum entanglement between two qubit representation devices, qubit 1 and qubit 2 and a second visual indicator of the quantum state of Qubit 1 and Qubit 2.

In representation 410, qubit 1 and qubit 2 are both in the state of 0 and are not entangled. As qubit 1 and qubit 2 are not entangled, there is no visual indicator of entanglement between them. In an embodiment, the second visual indicator can be based on a color or greyscale. In representation 410, both qubit 1 and qubit 2 are in the quantum state of 0, and as such, the second visual indicator for both qubit 1 and qubit 2 is black.

In representation 420, qubit 1 and qubit 2 are both in the state of 1 and not entangled. As qubit 1 and qubit 2 are not entangled, there is no visual indicator of entanglement between them. In representation 420, both qubit 1 and qubit 2 are in the quantum state of 1, and as such, the second visual indicator for both qubit 1 and qubit 2 is white.

In representation 430, qubit 1 and qubit 2 are highly entangled and the quantum state is represented as a probability. In an embodiment, the second visual indicator can comprise a greyscale where a darker shade represents a high probability of finding the given qubit representation device in the quantum state of 0, and a lighter shade represents a higher probability of finding the given qubit representation device in the quantum state of 1. In representation 430, as there is a high degree of quantum entanglement between qubit 1 and qubit 2, visual indicator 432 is a relatively thick band representing a high degree of quantum entanglement. As there is a high degree of quantum entanglement, qubit 1 and qubit 2 are more likely to be found in the same quantum state, and as such the second visual indicator for both is the same shade of grey.

In representation 440, qubit 1 and qubit 2 are entangled to a low degree and the quantum state is shown as a probability. In representation 440, as there is a low degree of quantum entanglement, visual indicator 442 is a relatively thin band. As there is a low degree of quantum entanglement, qubit 1 and qubit 2 are more likely to be found in different quantum states, and as such the second visual indicator is a different shade of grey for qubit 1 and qubit 2, representing different probabilities of finding them in a given quantum state.

Figure 5:
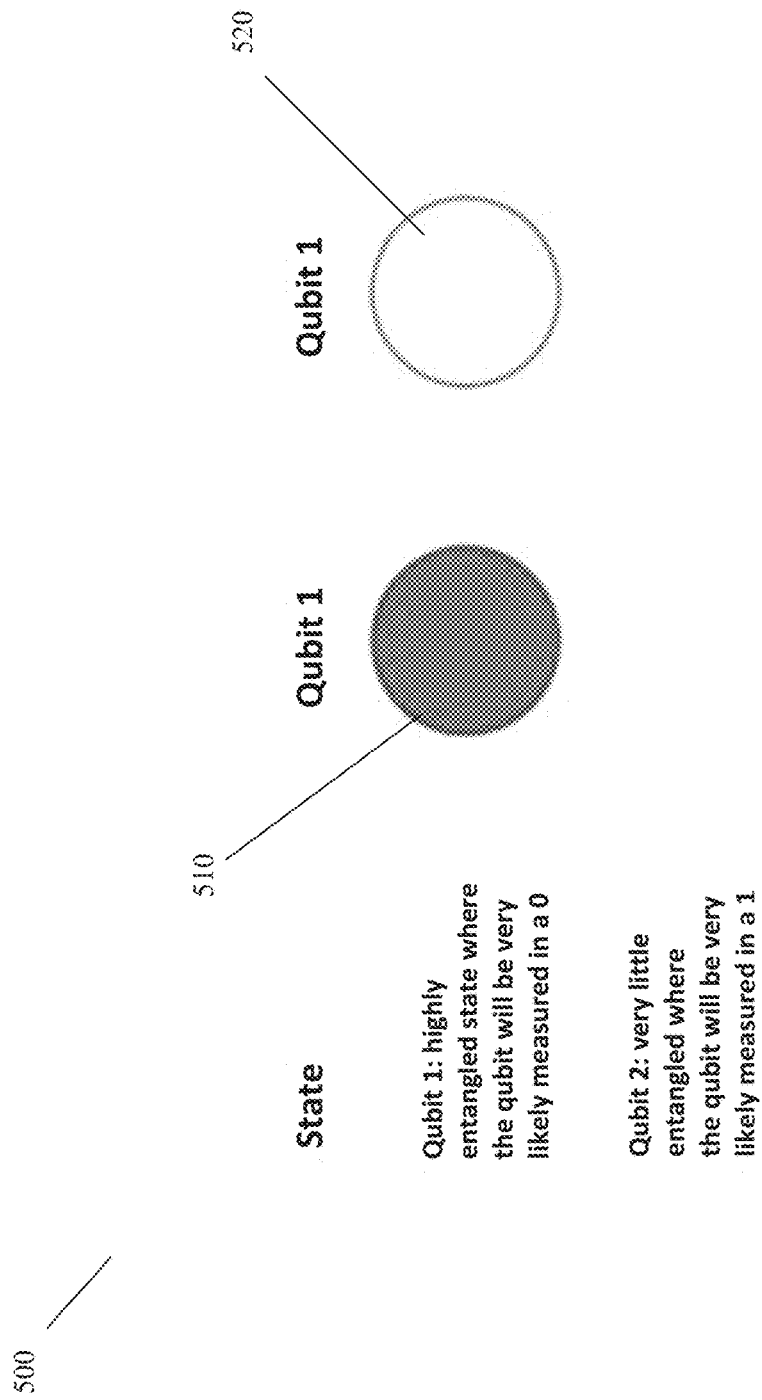
FIG. 5 illustrates an example, non-limiting diagram that can facilitate representation of quantum entanglement in accordance with one or more embodiments described herein.

FIG. 5 illustrates an example, non-limiting diagram 500 that can facilitate representation of quantum entanglement in accordance with one or more embodiments described herein. Repetitive description of like elements and/or processes employed in respective embodiments is omitted for sake of brevity.

Diagram 500 comprises two qubit representation devices, qubit 1 and qubit 2. In diagram 500 the visual indicator of quantum entanglement is shown on a color scale, where red represents a high degree of entanglement, orange represents some degree of entanglement, and yellow represents little to no entanglement. Additionally, in diagram 500 the second visual indicator of quantum state is shown through a transparency scale where an opaque color represents a high probability of finding the qubit representation device in the 0 state and a transparent color represents a high probability of finding the qubit representation device in the 1 quantum state. As such, in diagram 500 qubit 1 is shown with a red visual indicator 510 that is opaque representing that qubit 1 is highly entangled and there is a high probability of finding qubit 1 in the quantum state of 0. Qubit 2 is shown with a yellow visual indicator 520 that is transparent representing that qubit 2 has very little entanglement and there is a high probability of finding qubit 2 in the quantum state of 1. It should be appreciated that the color scale used to represent the degree or amount of entanglement can be any color scale using any color on the visible spectrum to represent a particular degree of entanglement.

Figure 6B:
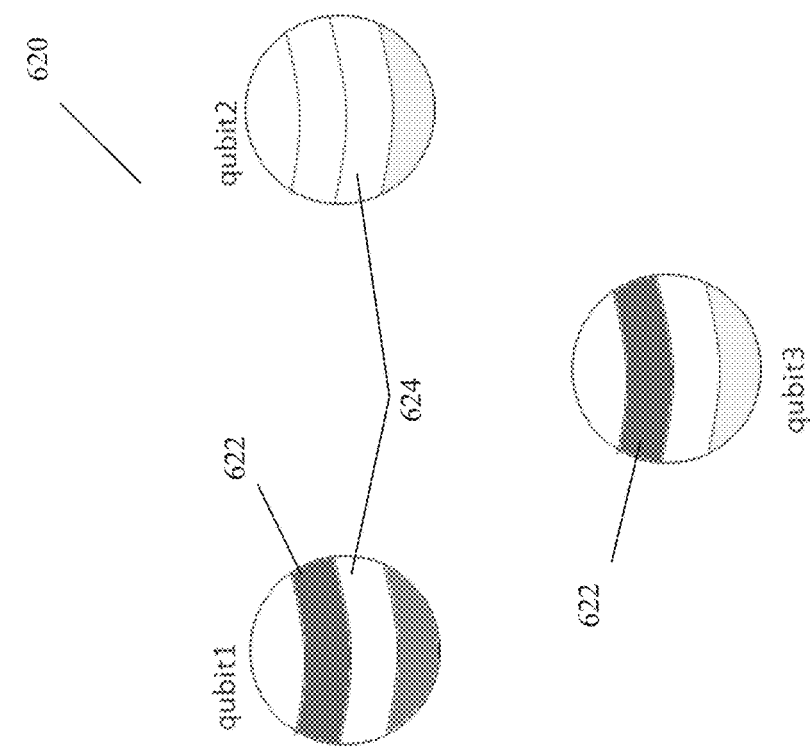
FIG. 6B illustrates an example, non-limiting diagram that can facilitate representation of quantum entanglement in accordance with one or more embodiments described herein.
Figure 6A:
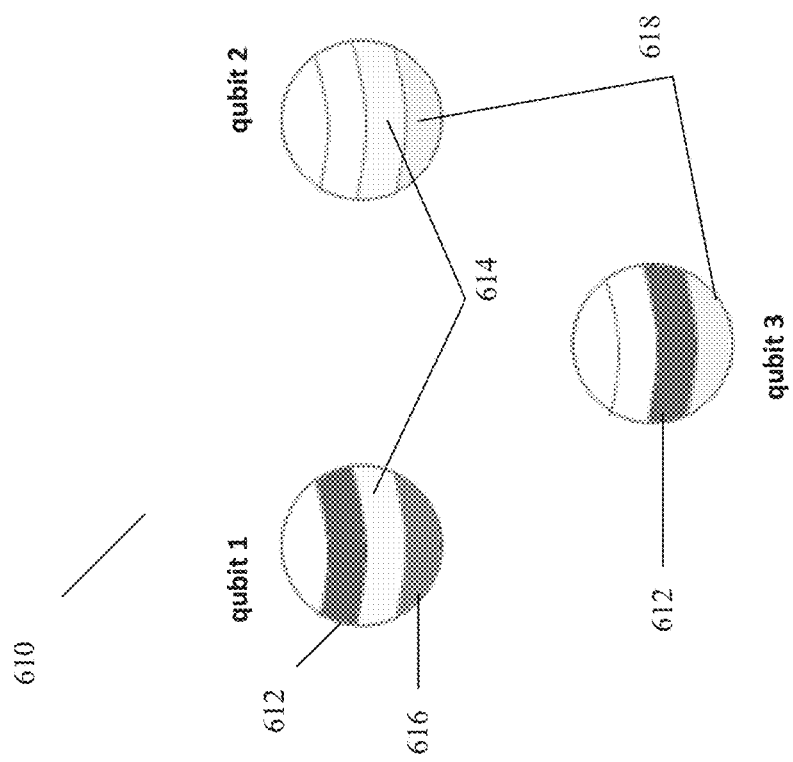
FIG. 6A illustrates an example, non-limiting diagram that can facilitate representation of quantum entanglement in accordance with one or more embodiments described herein.

FIG. 6A illustrates an example, non-limiting diagram 610 that can facilitate representation of quantum entanglement in accordance with one or more embodiments described herein. Repetitive description of like elements and/or processes employed in respective embodiments is omitted for sake of brevity.

Diagram 610 comprises three qubit representation devices, qubit 1, qubit 2, and qubit 3. In an embodiment, the visual indicator can be a series of colored stripes on the qubit representation devices, wherein two of more qubit devices having a stripe of the same color represents that they are entangled and the shade of the color of the stripe represents the degree of entanglement. In another embodiment, the second visual indicator can comprise a grey scale representing a probability of finding a qubit representation device in a given state. In diagram 610, qubit 1 and qubit 3 are highly entangled and qubit 2 and qubit 1 are slightly entangled. As such, the visual indicator comprises a bright blue stripe 612 on both qubit 1 and qubit 3 to show that they are entangled with each other to a high degree. Similarly, the visual indicator comprises a dull yellow stripe 615 on qubit 1 and qubit 2 to show that they are entangled with each other to a low degree. As there is no entanglement between qubit 2 and qubit 3, the visual indicator does not comprise a stripe of the same color on both qubit 2 and qubit 3. Also shown in diagram 610, the second visual indicator is shown as the lowest stripe on qubit 1, qubit 2, and qubit 3. For example, qubit 1 has a second visual indicator of a dark grey 616 showing a higher probability of finding qubit 1 in the quantum state of 0, whereas qubit 2 and qubit 3 have a second visual indicator of light grey 618 showing a higher probability of finding qubit 2 and qubit 3 in the quantum state of 1. It should be appreciated that the first and second visual indicators of diagram 610 can be changed by control component 220 and/or display component 130. For example, if control component 220 receives a measurement instruction to lower the degree of quantum entanglement between qubit 1 and qubit 3, control component 220 can signal display component 130 to change the visual indicator to comprise a darker shade blue stripe to show a lower degree of entanglement between qubit 1 and qubit 3.

FIG. 6B illustrates an example, non-limiting diagram 620 that can facilitate representation of quantum entanglement in accordance with one or more embodiments described herein. Repetitive description of like elements and/or processes employed in respective embodiments is omitted for sake of brevity.

Diagram 620 comprises three qubit representation devices, qubit 1, qubit 2, and qubit 3. In an embodiment, the visual indicator can be a series of colored stripes on the qubit representation devices, wherein two of more qubit devices having a stripe of the same color represents that they are entangled and the shade of the color of the band represents the degree of entanglement. Additionally, the stripes may be presented in a numerical order for a better visualization. In diagram 620, qubit 1 and qubit 3 are highly entangled and qubit 2 and qubit 1 are slightly entangled. As such, the visual indicator comprises a bright blue stripe 622 on the same location on the surface of qubit 1 and qubit 3 and a dull yellow stripe 624 on the same location of the surface of qubit 2 and qubit 1. In an embodiment, the location of the bands within the visual indicator can be changed. For example, if control component 220 receives a measurement instruction to change the entanglement between qubit 1 and qubit 2 to no entanglement, then display component 130 can change the location of the dull yellow stripe 624 in the visual indicator on both qubit 1 and qubit 2 to the location where the bright blue band 622 was previously.

Figure 7:
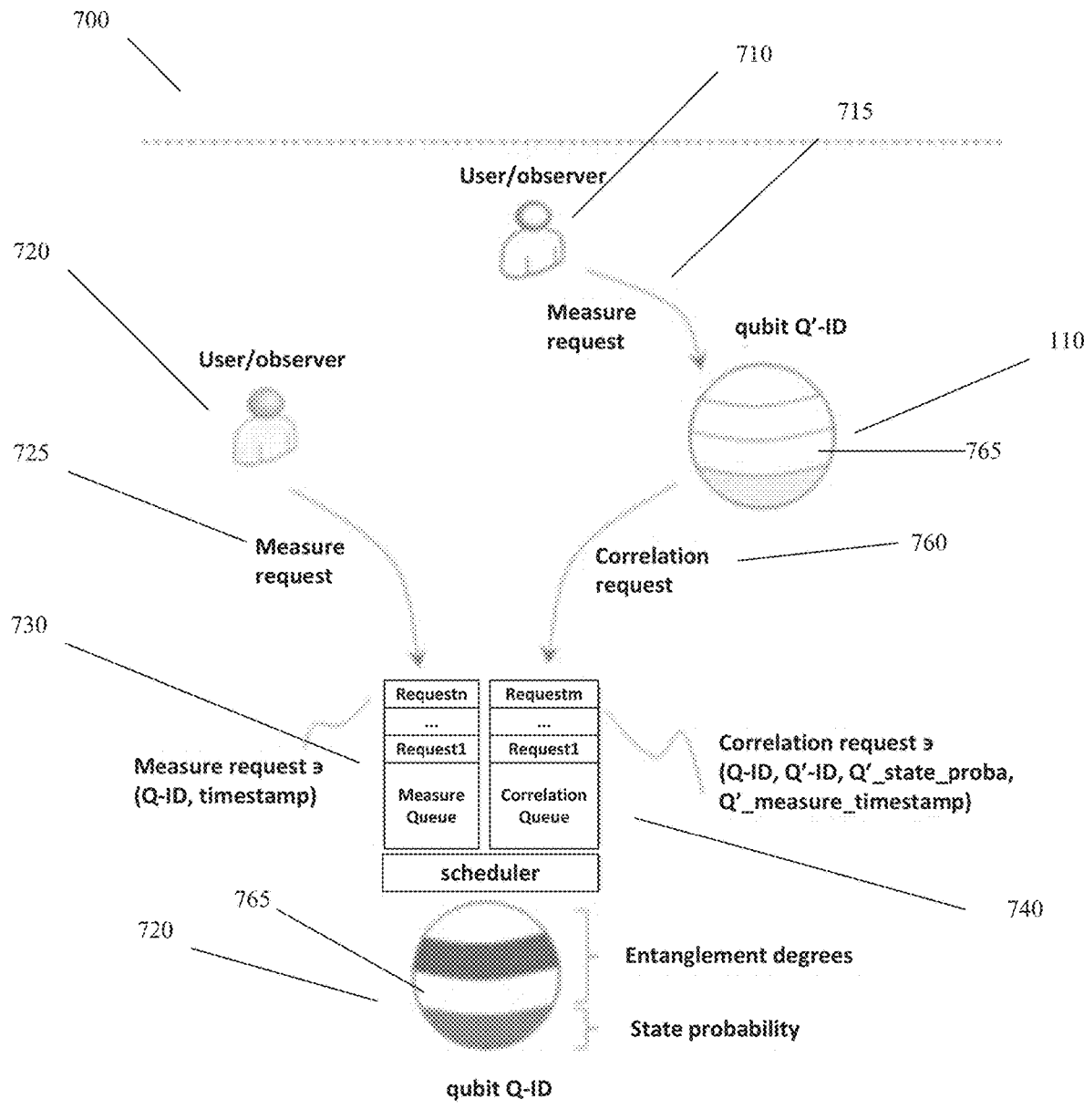
FIG. 7 illustrates an example, non-limiting diagram that can facilitate physical representation of quantum entanglement in accordance with one or more embodiments described herein.

FIG. 7 illustrates an example, non-limiting diagram 700 that can facilitate physical representation of quantum entanglement in accordance with one or more embodiments described herein. Repetitive description of like elements and/or processes employed in respective embodiments is omitted for sake of brevity.

Diagram 700 comprises qubit representation devices 110 and 120, users 710 and 720, a measure queue 730, and a correlation queue 740.

Control component 220 can receive measurement instruction 715 to update the quantum state of qubit representation device 110. Control component 220 can then assign a time value to measurement instruction 715 based on when it was received and add measurement instruction 715 to measure queue 730. For each qubit representation device that qubit representation device 110 is entangled with, control component 220 can generate a correlation instruction for the entangled qubit representation device. For example, as qubit representation device 110 is entangled with qubit representation device 120 (shown by the yellow stripe 765 on both), control component 220 can generate correlation instruction 760 for qubit representation device 120, assign the same time value to correlation instruction 760 as measurement instruction 715, and place correlation instruction 760 in correlation queue 740. Control component 220 can receive measurement instruction 725. As measurement instruction 725 was received after measurement instruction 715, control component 220 can assign measurement instruction 725 a later time value and place measurement instruction 725 in measure queue 730.

Control component 220 can then check measure queue 730 and correlation queue 740 for the instruction with the lowest time value. If a measurement instruction and a correlation instruction have the same time value, control component 220 can perform the measurement instruction first. Here, measurement instruction 715 and correlation instruction 760 have the same time value. Control component 220 can then perform measurement instruction 715 as described above in reference to FIGS. 2 and 3, remove it from measure queue 730 and signal display component 130 to change the visual indicator and/or the second visual indicator. Control component 220 can then check measure queue 730 and correlation queue 740 again for the instruction with the lowest time value. As correlation instruction 760 has the same time value as measurement instruction 715, it has a lower time value than measurement instruction 725. Control component 220 can then perform correlation instruction 760 as described above in reference to FIGS. 2 and 3, remove it from correlation queue 740 and signal display component 130 to change the visual indicator and/or the second visual indicator. Control component 220 can then perform the instruction with the lowest time value, measurement instruction 725, remove it from measure queue 730, and signal display component 130 to change the visual indicator and/or the second visual indicator. It should be appreciated that if qubit representation device 120 is entangled to additional qubit representation devices besides qubit representation device 110, control component 220 can generate correlation instructions for each of the additional qubit representation devices and assign the correlation instructions the same time value as measurement instruction 715. In an embodiment, the actions done by control component 220 are distributed on the several qubit representation devices. Every device can store in its internal storage its state probability and the list of qubit representation devices it is entangled with, as well as the degree of entanglement. It can also manage the measurement and correlation instructions it receives from other qubits and can generate its own instructions towards other qubits. In such an embodiment, the only role of the control component is to keep all spheres time-synchronized.

Figure 8:
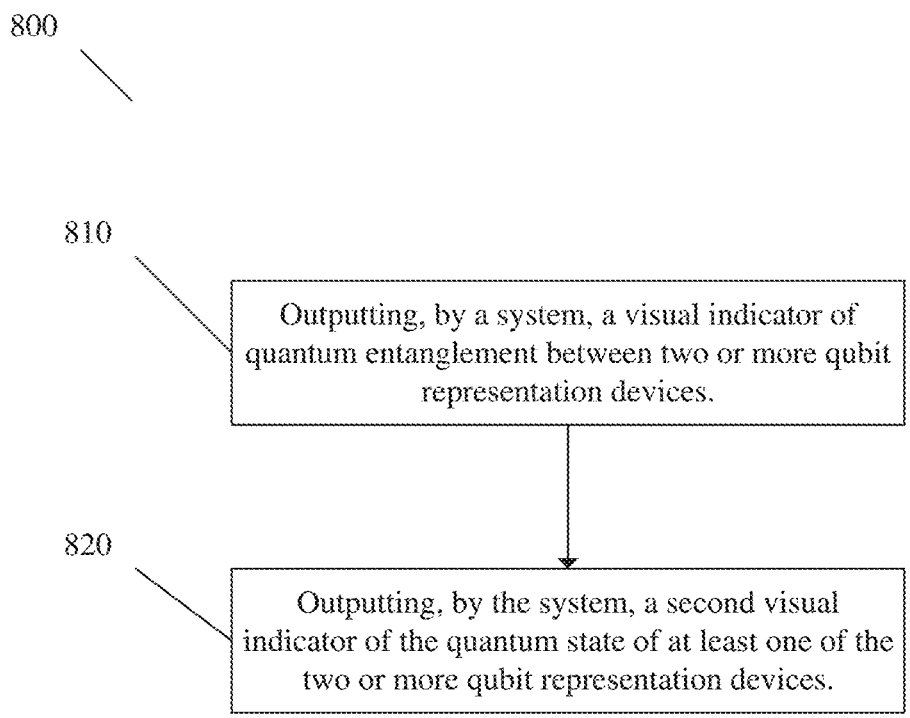
FIG. 8 illustrates a flow diagram of an example, non-limiting computer-implemented method that can facilitate physical representation of quantum entanglement in accordance with one or more embodiments described herein.

FIG. 8 illustrates a flow diagram of an example, non-limiting computer-implemented method 800 that can facilitate physical representation of quantum entanglement in accordance with one or more embodiments described herein. Repetitive description of like elements and/or processes employed in respective embodiments is omitted for sake of brevity.

At 810, computer-implemented method 800 can comprise outputting, by a system (e.g., quantum entanglement representation system 301 and/or display component 130) operatively coupled to a processor (e.g., processor 303), a visual indicator of quantum entanglement between two or more qubit representation devices. For example, as described above in reference to FIGS. 1, 2, and 3, Display component 130 and/or display components 215 and 225 can output a visual indicator of quantum entanglement between two or more qubit representation devices, such as qubit representation devices 110 and 120. In an embodiment, display component 130 can output a visual band between two or more qubit representation devices wherein the thickness of the band represents the degree of entanglement. In another embodiment, display component 130 can output a color onto the surface of at least one of the two or more qubit representation devices, wherein the degree of entanglement is represented on a color scale. In an additional embodiment, display component 130 can display different stripes of color onto different portions of the at least one of the two or more qubit representation devices, wherein each stripe represents entanglement with a qubit representation device and the degree of entanglement is represented by the shade (e.g., dark or light) of the color of the stripe.

At 820, computer-implemented method 800 can comprise, outputting, by the system (e.g., quantum entanglement representation system 301 and or/display component 130), a second visual indicator of the quantum state of at least one of the two or more qubit representation devices. For example, as described above in reference to FIGS. 1, 2, and 3, display component 130 can output a second visual indicator onto the surface of at least one of the two or more qubit representation devices, wherein the second visual indicator is on a greyscale that represents a probability of finding the qubit representation device in a given quantum state. In another embodiment, the second visual indicator can be on a transparency scale and output on top of the visual indicator of quantum entanglement.

Figure 9:
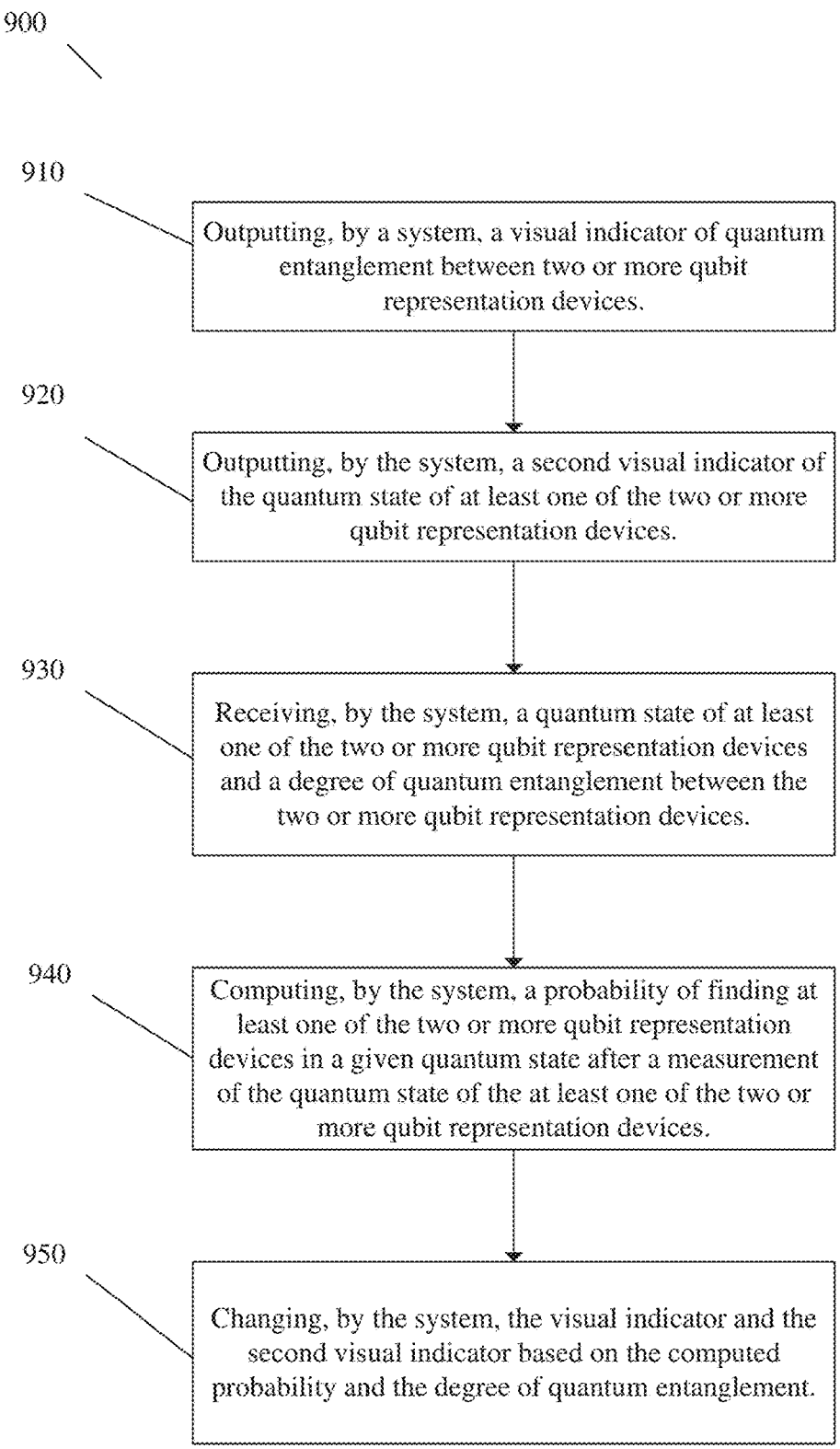
FIG. 9 illustrates a flow diagram of an example, non-limiting computer-implemented method that can facilitate physical representation of quantum entanglement in accordance with one or more embodiments described herein.

FIG. 9 illustrates a flow diagram of an example, non-limiting computer implemented method 900 that can facilitate physical representation of quantum entanglement in accordance with one or more embodiments described herein. Repetitive description of like elements and/or processes employed in respective embodiments is omitted for sake of brevity.

At 910, computer-implemented method 900 can comprise outputting, by a system (e.g., quantum entanglement representation system 301 and/or display component 130) operatively coupled to a processor (e.g., processor 303), a visual indicator of quantum entanglement between two or more qubit representation devices. For example, as described above in reference to FIGS. 1, 2, and 3, Display component 130 and/or display components 215 and 225 can output a visual indicator of quantum entanglement between two or more qubit representation devices. In an embodiment, display component 130 can output a visual band between two or more qubit representation devices wherein the thickness of the band represents the degree of entanglement. In another embodiment, display component 130 can output a color onto the surface of at least one of the two or more qubit representation devices, wherein the degree of entanglement is represented on a color scale. In an additional embodiment, display component 130 can display different stripes of color onto different portions of the at least one of the two or more qubit representation devices, wherein each band represents entanglement with a qubit representation device and the degree of entanglement is represented by the shade (e.g., dark or light) of the color of the stripe.

At 920, computer-implemented method 900 can comprise, outputting, by the system (e.g., quantum entanglement representation system 301 and or/display component 130), a second visual indicator of the quantum state of at least one of the two or more qubit representation devices. For example, as described above in reference to FIGS. 1, 2, and 3, display component 130 can output a second visual indicator onto the surface of at least one of the two or more qubit representation devices, wherein the second visual indicator is on a greyscale that represents a probability of finding the qubit representation device in a given quantum state. In another embodiment, the second visual indicator can be on a transparency scale and output on top of the visual indicator of quantum entanglement.

At 930, computer-implemented method 900 can comprise receiving, by the system (e.g., quantum entanglement representation system 301 and/or control component 220), a quantum state of at least one of the two or more qubit representation devices and a degree of quantum entanglement between the two or more qubit representation devices. For example, as described above in reference to FIGS. 2 and 3, control component 220 can receive a measurement instruction to change the quantum state and/or quantum entanglement of one or more qubit representation devices. The measurement instruction can comprise a new probability of finding one or more qubits in a given quantum state and/or an updated degree of quantum entanglement between two or more qubit representation devices.

At 940, computer-implemented method 900 can comprise computing, by the system (e.g., quantum entanglement representation system 301 and/or control component 220), a probability of finding at least one of the two or more qubit representation devices in a given quantum state after the measurement of the quantum state of the at least one of the two or more qubit representation devices. For example, as described above in reference to FIGS. 2 and 3, control component 220 can determine an updated quantum state of the at least one of the two or more qubit representation devices using the updated probability received in the measurement instruction and a random number generator. Additionally, control component 220 can determine a new quantum state for a qubit representation devices entangled with the at least one of the two or more qubit representation devices using the updated quantum state of the at least one of the two or more qubit representation devices, the probability of finding the entangled qubit representation device in a given state, and the degree of quantum entanglement between the at least one of the two or more qubit representation devices and the entangled qubit representation device.

At 950, computer-implemented method 900 can comprise changing, by the system (e.g., quantum entanglement representation system 301 and/or display component 130), the visual indicator and the second visual indicator based on the computed probability and the degree of quantum entanglement. For example, as described above in reference to FIGS. 1, 2, and 3, display component 130 can update the visual indicator of quantum entanglement based on the updated degree of quantum entanglement received in the measurement instruction at 930. Display component 130 can also update the second visual indicator of quantum state using the probability computed at 940. For example, display component 130 can adjust the second visual indicator on a greyscale to represent the new probability of finding a qubit representation device in a given quantum state after the measurement instruction received at 930.

Apparatus 100, apparatus 200, and quantum entanglement representation system 301 can provide improvements in representing quantum entanglement. For example, by outputting a visual representation of the quantum entanglement between two or more qubit representation devices, apparatus 200 enables a user to observe quantum entanglement in an intuitive and more easily understood way. In another example, by outputting a second visual indicator of the quantum state of at least one of the two or more qubit representation devices, apparatus 200 enables a user to observe how quantum entanglement impacts quantum state in an intuitive and more easily understood way.

Quantum entanglement representation system 301 can employ hardware and/or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above. Quantum entanglement representation system 301 and/or components thereof, can be employed to solve new problems that arise through advancements in technologies such as machine learning, employment of quantum computing systems, cloud computing systems, computer architecture, and/or another technology.

It is to be appreciated that quantum entanglement representation system 301 can utilize various combinations of electrical components, mechanical components, and circuitry that cannot be replicated in the mind of a human or performed by a human, as the various operations that can be executed by quantum entanglement representation system 301 and/or components thereof as described herein are operations that are greater than the capability of a human mind. For instance, the amount of data processed, the speed of processing such data, or the types of data processed by quantum entanglement representation system 301 over a certain period of time can be greater, faster, or different that the amount, speed, or data type that can be processed by a human mind over the same period of time.

According to several embodiments, quantum entanglement representation system 301 can also be fully operational towards performing one or more other functions (e.g., fully powered on, fully executed, and/or another function) while also performing the various operations described herein. It should be appreciated that such simultaneous multi-operational execution is beyond the capability of a human mind. It should also be appreciated that quantum entanglement representation system 301 can include information that is impossible to obtain manually by an entity, such as a human user. For example, the type, amount, and/or variety of information included in quantum entanglement representation system 301, display component 130, and/or control component 220 can be more complex than information obtained manually by an entity, such as a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
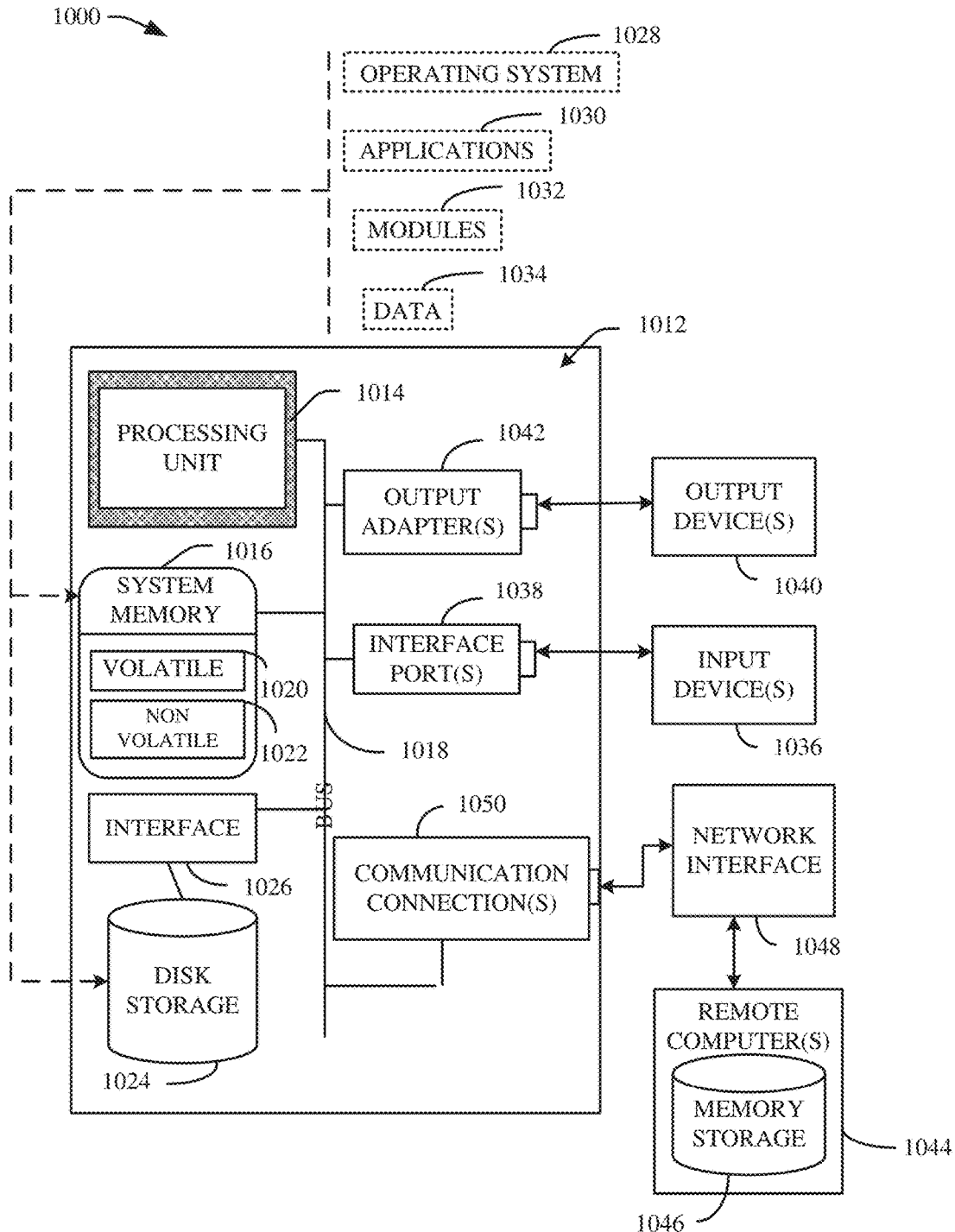
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 812 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 844.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
   two or more qubit representation devices that interact with one another in a defined manner; and
   a display component operatively coupled to at least one of the two or more qubit representation devices, wherein the display component outputs, onto a respective surface of at least one of the two or more qubit representation devices, a visual indicator comprising a first visual indicator of quantum entanglement between the two or more qubit representation devices and a second visual indicator of a quantum state of at least one of the two or more qubit representation devices.

2. The apparatus of claim 1, further comprising:
   a memory that stores computer executable components; and
   a processor that executes at least one of the computer executable components that:
      receives at least one of an inputted quantum state of at least one of the two or more qubit representation devices or an inputted degree of quantum entanglement between the two or more qubit representation devices;
      determines a probability of finding at least one of the two or more qubit representation devices in a given state after a measurement of respective quantum states of the at least one of the two or more qubit representation devices; and
      signals the display component to configure the visual indicator based on the probability.

3. The apparatus of claim 2, wherein the at least one of the computer executable components further:
   executes measurement instructions from one or more users that sequentially updates at least one of the inputted quantum state of the at least one of the two or more qubit representation devices or the inputted degree of quantum entanglement between the two or more qubit representation devices.

4. The apparatus of claim 1, wherein the display component comprises one or more light emitting diodes.

5. The apparatus of claim 1, wherein the two or more qubit representation devices are spherical in shape.

6. The apparatus of claim 1, wherein at least one of the two or more qubit representation devices comprises a plastic thermochromic material.

7. The apparatus of claim 1, wherein the visual indicator comprises different colors on different regions of the respective surface of the at least one of the two or more qubit representation devices to indicate a level of quantum entanglement between the two or more qubit representation devices.

8. The apparatus of claim 1, wherein the display component comprises an augmented reality device that outputs the visual indicator depending on which qubit representation device of the two or more qubit representation devices a user looks at.

9. A system comprising:
   two or more qubit representation devices respectively representing different qubits of one or more quantum computing devices;
   at least one display component operatively coupled to at least one of the two or more qubit representation devices;
   a memory that stores computer executable components; and
   a processor that executes at least one of the computer executable components that:
      controls the at least one display component to output, onto at least one surface of at least one of the two or more qubit representation devices, a visual indicator of quantum entanglement amongst the different qubits using the two or more qubit representation devices.

10. The system of claim 9, wherein the at least one of the computer executable components further:
    receives input specifying at least one of a respective inputted quantum state of at least one of the different qubits or an inputted degree of quantum entanglement between the different qubits;
    determines a probability of finding at least one of the different qubits in a given state after a measurement of respective quantum states of the at least one of the different qubits; and
    signals the at least one display component to configure the visual indicator based on the probability.

11. The system of claim 10, wherein the at least one of the computer executable components further:
    determines a degree of quantum entanglement amongst the different qubits after the measurement of respective quantum states of the at least one of the two or more qubit representation devices; and
    signals the at least one display component to configure the visual indicator based on the probability and the degree of quantum entanglement.

12. The system of claim 9, wherein the at least one display component comprises one or more light emitting diodes.

13. The system of claim 9, wherein the visual indicator comprises a first visual indicator of the quantum entanglement amongst the different qubits and a second visual indicator of a quantum state of at least one of the different qubits.

14. The system of claim 9, wherein the visual indicator comprises different colors on different regions of the at least one surface of the at least one of the two or more qubit representation devices to indicate a level of quantum entanglement amongst the two or more qubit representation devices.

15. The system of claim 9, wherein the two or more qubit representation devices are spherical in shape.

16. The system of claim 9, wherein at least one of the two or more qubit representation devices comprises a plastic thermochromic material.

17. A computer-implemented method, comprising:
   determining, by a system operatively coupled to a processor, a degree of quantum entanglement amongst different qubits of one or more quantum computing devices; and
   outputting, by the system onto a respective surface of at least one of two or more qubit representation devices respectively representing the different qubits, a visual indicator comprising a first visual indicator of quantum entanglement amongst the different qubits and a second visual indicator of a quantum state of at least one of the two or more qubit representation devices.

18. The computer-implemented method of claim 17, further comprising:
   receiving, by the system, input specifying at least one of a respective inputted quantum state of at least one of the different qubits or an inputted degree of quantum entanglement between the different qubits,
   determining, by the system, a probability of finding at least one of the different qubits in a given state after a measurement of respective quantum states of the at least one of the different qubits; and
   configuring, by the system, the visual indicator based on the probability.

19. The computer-implemented method of claim 18, further comprising:
   determines a degree of quantum entanglement amongst the different qubits after the measurement of respective quantum states of the at least one of the two or more qubit representation devices; and
   configuring the visual indicator based on the probability and the degree of quantum entanglement.

20. The computer-implemented method of claim 17, wherein the two or more qubit representation devices are spherical in shape.

* * * * *